(12) United States Patent
Bentkovski et al.

(10) Patent No.: US 8,374,586 B2
(45) Date of Patent: Feb. 12, 2013

(54) METHOD AND SYSTEM FOR TRANSMISSION OF IMAGES FROM A MONITORED AREA

(75) Inventors: Yakov Bentkovski, Ness Ziona (IL); Moshe Borovitz, Tel Aviv (IL)

(73) Assignee: Pima Electronic Systems Ltd., Holon (IL)

( * ) Notice: Subject to any disclaimer, the term of this patent is extended or adjusted under 35 U.S.C. 154(b) by 1589 days.

(21) Appl. No.: 11/516,614

(22) Filed: Sep. 7, 2006

(65) Prior Publication Data

US 2008/0062258 A1 Mar. 13, 2008

(51) Int. Cl.
*H04M 3/42* (2006.01)
(52) U.S. Cl. ............ 455/414.1; 340/539.18; 701/117
(58) Field of Classification Search ............... None
See application file for complete search history.

(56) References Cited

U.S. PATENT DOCUMENTS

| 6,476,858 | B1 | 11/2002 | Ramirez Diaz et al. |
| 7,061,399 | B2 | 6/2006 | Leck |
| 2003/0085998 | A1 | 5/2003 | Ramirez-Diaz et al. |
| 2004/0047471 | A1 | 3/2004 | Sawano |
| 2004/0233284 | A1 | 11/2004 | Lesesky et al. |
| 2005/0190061 | A1* | 9/2005 | Trela .................... 340/573.1 |
| 2006/0095199 | A1* | 5/2006 | Lagassey ................ 701/117 |
| 2007/0205888 | A1* | 9/2007 | Lee et al. ............. 340/539.18 |

FOREIGN PATENT DOCUMENTS

| WO | WO 99/66746 | 12/1999 |
| WO | WO 01/71992 | 9/2001 |
| WO | WO 2005116947 | 12/2005 |
| WO | WO 2006083551 | 8/2006 |

* cited by examiner

*Primary Examiner* — Phuoc Doan
(74) *Attorney, Agent, or Firm* — Occhiuti Rohlicek & Tsao LLP

(57) ABSTRACT

A system and method including one or more cameras or other sensors to monitor an area, and to transmit such images or sensory data to a local hub that may include a cellular modem. The hub may transmit images or data to a remote cellular handset, where a user may view the images or data, and may transmit a signal back to the hub to take an action in or relating to the area being monitored or relating to the camera or sensor monitoring the area.

73 Claims, 2 Drawing Sheets

METHOD AND SYSTEM FOR TRANSMISSION OF IMAGES FROM A MONITORED AREA

BACKGROUND OF THE INVENTION

Security systems that provide an image of an area to be monitored such as a field of regard or area of interest are known. Such systems however, leave a user who views an event in a monitored area without recourse as to an action to be taken or to a more in depth view or analysis of the nature of the event that may appear in an image.

There also are known camera units including a motion detector and having a cellular transmitter/receiver system for transmitting a picture to a mobile telephone in response to a received command or in response to detected motion in the field of regard. However, for a location having multiple areas of regard under surveillance, deploying such multiple units would be an expensive and inefficient solution.

SUMMARY OF THE INVENTION

In some embodiments, the invention includes a system having one or more cameras, to capture images of an area and wirelessly transmit the captured images, a central communication device that may communicate with the cameras, where the central communication device may wirelessly receive images from the cameras, transmit the images over a cellular network to a remote cellular device such as for example a cellular telephone, and receive a signal from the remote cellular device, where the signal may include for example an instruction to one or more cameras. In some embodiments, one or more of the cameras may be housed in a unit, that may include for example a sensor such as a motion detector, microphone, smoke detector, temperature change detector, carbon monoxide detector, flame detector, glass breakage detector and personal identification sensor.

In some embodiments, the communication device may transmit to a remote cellular device non-image sensory data collected by the sensor. In some embodiments, the non-image sensory data may include for example sound data collected by a microphone. In some embodiments the central communication device may receive from a remote cellular device such as for example a cellular telephone, an instruction selecting for viewing at the remote cellular device at least one view of a camera. In some embodiments, a system may include a processor to receive a unique identifier from a remote cellular device and to confirm authorization to view an image or issue an instruction to the system, based on the unique identifier. In some embodiments, the invention may include a memory to store identification data of one or more remote cellular devices, and the communication device may transmit an image to the remote cellular communication devices and may open for example a communication channel, such as a conference call among more than one remote cellular devices.

In some embodiments a system may include a memory to record for one or more cameras, one or more criteria, such as a location designation or password of a camera, and may include a processor to select a remote cellular communication device to control transmitting to such camera based on said criteria. In some embodiments, the criteria may include a time of day, a day of week, a security level associated with a remote cellular device, and a location of an area appearing in an image produced by a camera.

In some embodiments, a system may include a counter to count a number of images transmitted to a remote cellular communication device.

In some embodiments a system may include a communication device to transmit an image over a wired network.

In some embodiments, a system may include a processor to issue another signal in response to a first signal, where the another signal is to activate a device to take an action in response to an element in the image. In some embodiments, the action may include for example activating an alarm, turning on a light, and activating a fire fighting device. In some embodiments, a system may include a memory to store image data. In some embodiments, the communication device may issue a second signal to alter a setting of a camera in response to a signal from a remote cellular device. In some embodiments, the communication device may include a cellular modem. In some embodiments a central communication device is to transmit an identifier to a remote cellular device, where the identifier appears on a screen of the remote cellular device. In some embodiments, the central communication device is to receive a signal from a remote cellular device, where the signal includes an instruction to a security system in the area where the cameras are located.

In some embodiments, the central communication device may receive a signal from a remote cellular device, where the signal includes an instruction to activate a camera.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings in which:

It will be appreciated that for simplicity and clarity of illustration, elements shown in the figures have not necessarily been drawn accurately or to scale. For example, the dimensions of some of the elements may be exaggerated relative to other elements for clarity. Similarly one or several physical components may be included in one functional block or element or divided into more than one functional unit or element. Some of the blocks depicted in the figures may be combined into a single function.

DETAILED DESCRIPTION OF EMBODIMENTS OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits may not have been described in detail so as not to obscure the present invention.

Embodiments of the invention provide a method and apparatus for collecting and transmitting images of one or more fields of regard or areas of interest monitored by a security system and for executing actions directed by a recipient of such images. These implementations may be integrated into existing devices using firmware embedded in, for example, a hub or other hardware device.

The invention is described below in the context of a security system or remote look-in system. However, it will be apparent to persons skilled in the art that the invention may also be suitable for other systems or devices that call for remote look in response to images transmitted over wireless or wired networks.

Figure 1:
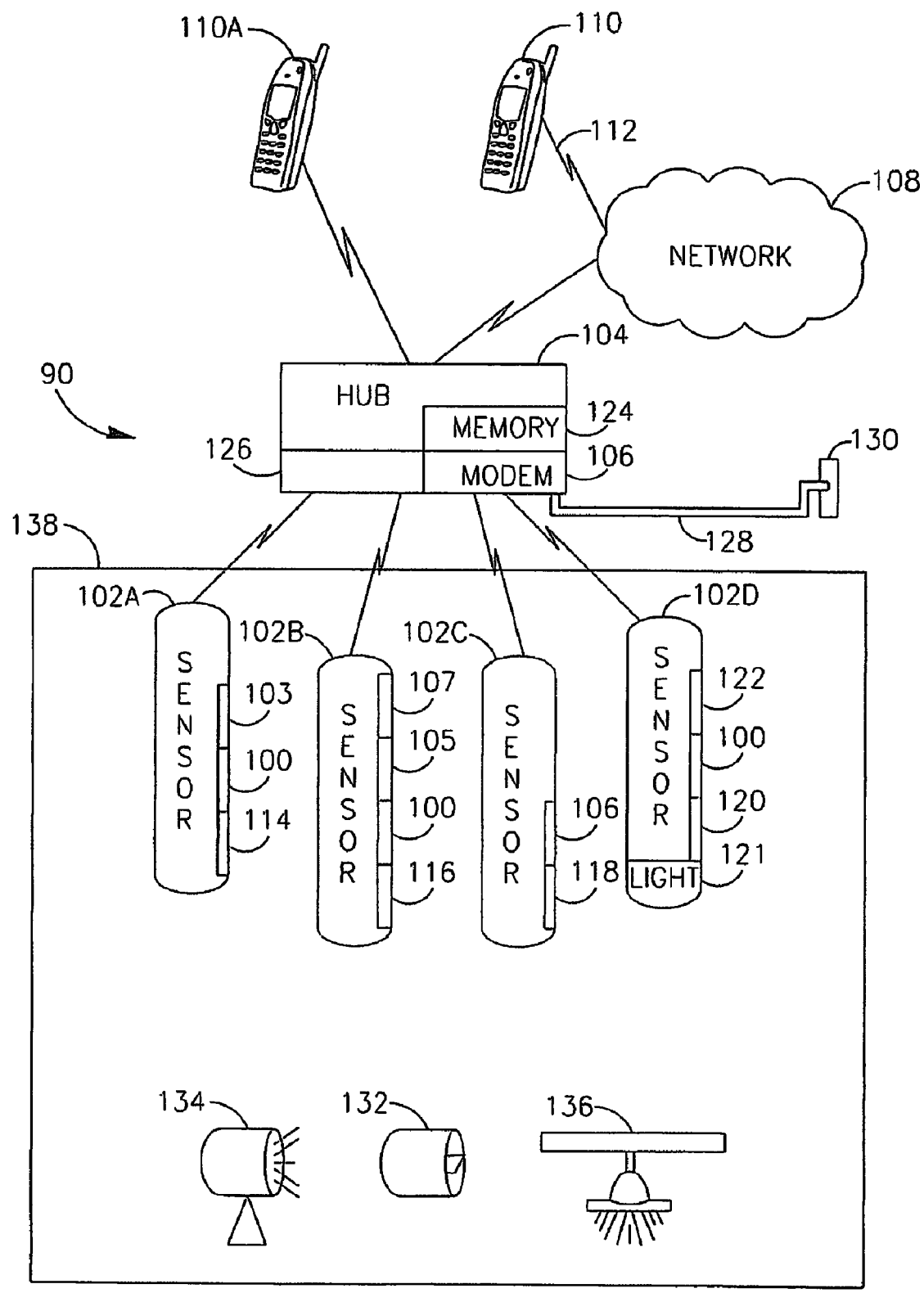
FIG. 1 is a simplified diagram of components of a security system with image transmission and communication capabilities according to embodiments of the present invention.

Reference is made to FIG. 1, a simplified diagram of components of a security or monitoring system with communication capabilities according to embodiments of the present invention. In some embodiments, system 90 may monitor or provide or capture still or video images of a field of regard or area of interest 138 that may be covered by a security, alarm or other monitoring system. In some embodiments, a system 90 may include one or more image sensors or cameras 100 such as digital or analog or video cameras that may be housed in a unit 102 that may be mounted, hidden or otherwise placed in area 138, and that may provide a view of a part or all of area 138. For example, one or more units 102A, 102B, 102C, 102D may be placed in various rooms around a house or office, where different cameras 100 of such units 102 provide views of different rooms or offices.

In addition to camera 100, a unit 102 may include other sensors such as for example a motion detector 114, a microphone 116 or other sound collector or detector, a smoke detector 118, flame detector, carbon monoxide detector, glass-breakage detector, a thermometer or temperature change detector 120, and a personal identification sensor 122 such as for example a voice sensor or other biometric sensor that may identify a person on the basis of physical characteristics or input codes. Unit 102 may also include a visible or invisible (such as infra red) light source 121 that may illuminate area 138 near such unit 102 upon certain conditions such as a trigger from a motion detector 114. In some embodiments, unit 102 may include a processor 107 that may include digital signal processing capabilities.

Unit 102 may also include or be connected to a transmitter/receiver 103 that may transmit signals such as signals including sensory data that may be collected by a sensor included in unit 102, and that may receive signals that may for example control or alter a function or functional state of a sensor or other component of unit 102. For example, signal 112 may be or include an instruction to turn a camera 100 on or off, to adjust an angle of images captured by the camera 100, or to digitally zoom, pan, or tilt a camera 100, or to mechanically zoom, pan or tilt the camera 100.

In some embodiments modem 106 may be or include one or more of a cellular modem, a dialup modem, a cable modem or other modem 106 capable of receiving and/or delivering signals over a network 108 such as for example a phone network, an IP network or other wired or wireless networks.

In some embodiments, transmitter/receiver 103 may transmit and receive signals over a wireless connection such as for example using infra red, radio frequency, or other electromagnetic signals. Such signals may be sent using a protocol such as Bluetooth, ZigBee, 802.11, 802.16 or other protocols layers as IP, TCP, UDP, DNS, SMTP, POP3, MIME, HTTP or FTP or over other suitable signal transmission formats. In some embodiments, transmitter/receiver 103 may be or include a PSTN, POTS dialup modem, and may support for example V.92, V.90, V.34, V24, V22, V21, and other POTS modem protocols or SMS (over PSTN). Transmitter/receiver 103 may operate over an IP network such as for example a secured 10/100Base-T LAN. Other protocols, systems and communication media are possible.

In some embodiments, transmitter/receiver 103 may be contained in a single component. In some embodiments, functions of transmitter/receiver 103 may be divided between two or more components.

In some embodiments, hub 104 may be or include a local communication device that may be located in area 138 or in another location. Hub 104 may include one or more modems 106 or other mechanisms to transmit digital signals over a communication network 108. In some embodiments, cellular modem may operate over for example a GSM, GPRS, UMTS, EDGE or other cellular network, and may transmit messages to remote cellular device using a SMS, MMS, IP, TCP, MIME, FTP or other protocols such as for example IMP-IP multi-media protocol.

In operation, a camera 100 of a unit 102 may capture one or more images of area 138 in response to a motion or other condition detected in area 138, and may transmit such images for example wirelessly via a radio frequency link to hub 104. Hub 104 may identify a remote user such as a cellular handset 110 to whom such image or other data is to be delivered, and may transmit the data over a network 108 to the user. A user may view the image and may in some embodiments respond by transmitting for example a signal 112 over a network 108 to hub 104 or to some other component suitable to effect an action in area 138. For example, a signal 112 may activate or deactivate a light 134, an alarm 132, a lock, fire-fighting equipment 136 or other response mechanism. Signal 112 may activate for example a speaker or microphone 116 to enable a user to see and communicate with an intruder or other person in area 138 in real time. In some embodiments, home automation control may be implemented using for example a X10 transceiver that may communicate with automation control equipment upon a standard protocol.

In some embodiments camera 100 may include one or more focusing mechanisms or image alteration functions that may for example alter a setting of camera 100 such as for example a focus, zoom, depth or other characteristics of an image to be captured. In some embodiments such mechanisms or functions may be activated by a signal originating from handset 110. Such signal from handset 110 may be for example received by hub 104 or by some other mechanism, and hub 104 may transmit a signal to for example a specific unit 102 to alter a setting of a sensor of such unit 102.

Modem 106 in hub 104 may collect one or more signals such as one or more images from camera 100 or a multiple of cameras 100. Hub 104 may transmit one or more images or other data over network 108 such as a cellular or other network to for example a cellular handset 110 or other personal cellular receiver. In some embodiments hub 104 may include or be connected to modem 106 or to another modem that may be connected to a line 128 that may link to a wired network 130 such as a local area network or wide area network. In some embodiments, images collected by camera 100 may also be transmitted over a wired network 130 or wireless LAN to for example a local or remote PC.

In some embodiments, handset 110 may display for example one or more menus that may let a user for example select a camera 100 or unit 102 whose data is to be transmitted. Another menu or selection on handset 110 may let a user select a response action to be taken by for example light 134, alarm 132, fire-fighting equipment 136 or other alarm or response mechanism to an element in area 138, such as for example an intruder, a fire, a person with a medical emergency or other elements. In some embodiments, a program or instructions to operate such menu and functions from handset 110 may be included in for example a JAVA applet that need not be downloaded separately into handset 110, such as for example one that uses a WAP server.

In some embodiments, a processor in for example hub 104 may send an image or other sensory data collected from unit 102 to more than one handset 110 and 110A, and may establish a conference call or other multi-party communication channel between such handset 110 and 110A so that for example both parents of a child may view an image transmitted from area 138, or so that a resident of a home included in area 138 may speak with for example law enforcement or emergency service officials who see the images and hear the user on handset 110. In some embodiments images may be sent to a screen, monitor or other display that is not connected to a handset 110, over a network 130 such as a telephone network, local area network, wide area network, etc. In some embodiments, images or messages sent over such other network 130 may serve as a back up to images sent over a wireless network 108, if a user cannot be reached over such wireless network 108. Other uses are possible.

In some embodiment, a camera 100, unit 102 or for example a processor in for example hub 104 or elsewhere may include identification information of the location of unit 102 or of the part of area 138 that is the subject of the image. In some embodiments, a user may be required to input a password or other unique identification or security clearance to receive access to images of a particular area. A memory 124 that may be in or connected with hub 104 may store an index or data base of users or handsets 110, and may associate such users or their identification numbers with the parts of area 138 or images from cameras 100 that such user or handset 110 is permitted to view. Other criteria or policies may be included in such index or data base. For example, a night security officer may be given access to images of a warehouse at off-hours but not during business hours or at other times of day. A shipping office may be given access to images of a shipping area but not of a boardroom. Other criteria are possible. In some embodiments, a user may program or enter criteria or policies in response to an image or event. For example, a user may grant viewing access to other users in the event that lie detects an emergency in a particular area. In some embodiments an image may be encrypted, and a proposed viewer of the event may have to authenticate access or identity in order to view the images.

In some embodiments, a processor or counter 126 within hub 104 or elsewhere may count a number of images or frames that are transmitted to or over network 108 or to handset 110, and a charge to a user may be accrued based upon such number of flames or viewing time transmitted to a user. Other bases for charging for use of the system are possible.

In some embodiments, a memory 124 in hub 104 or in another location may store one or more images or other sensory data, and may transmit such data to a handset 110 or other device upon a signal or other command from for example a remote device. In some embodiments, images or video may be stored in a memory of a sensor such as camera 100 and may be transmitted to hub 104 in for example batches or at other intervals.

In some embodiments, hub 104 or another device may deliver for example an email, SMS, MMS, WAP or other notification or message that an image of area 138 has been delivered to him or is ready to be viewed. In some embodiments, such a message may contain for example still images. In some embodiments, such a message may for example begin or initiate a video streaming function or may invite the user to connect to another network to view other images, such as may be included in an email, IM or other message.

In some embodiments, unit 100 or hub 104 may include for example a mass data storage device such as a flash or disc drive that may store for example video or a multitude of images. In some embodiments, the mass data storage device may be linked to a computer via a USB, and back up of images or video may be stored onto the memory. In some embodiments, parameters of camera 100 or hub 104 may be configured via a USB link through hub 104.

Figure 2:
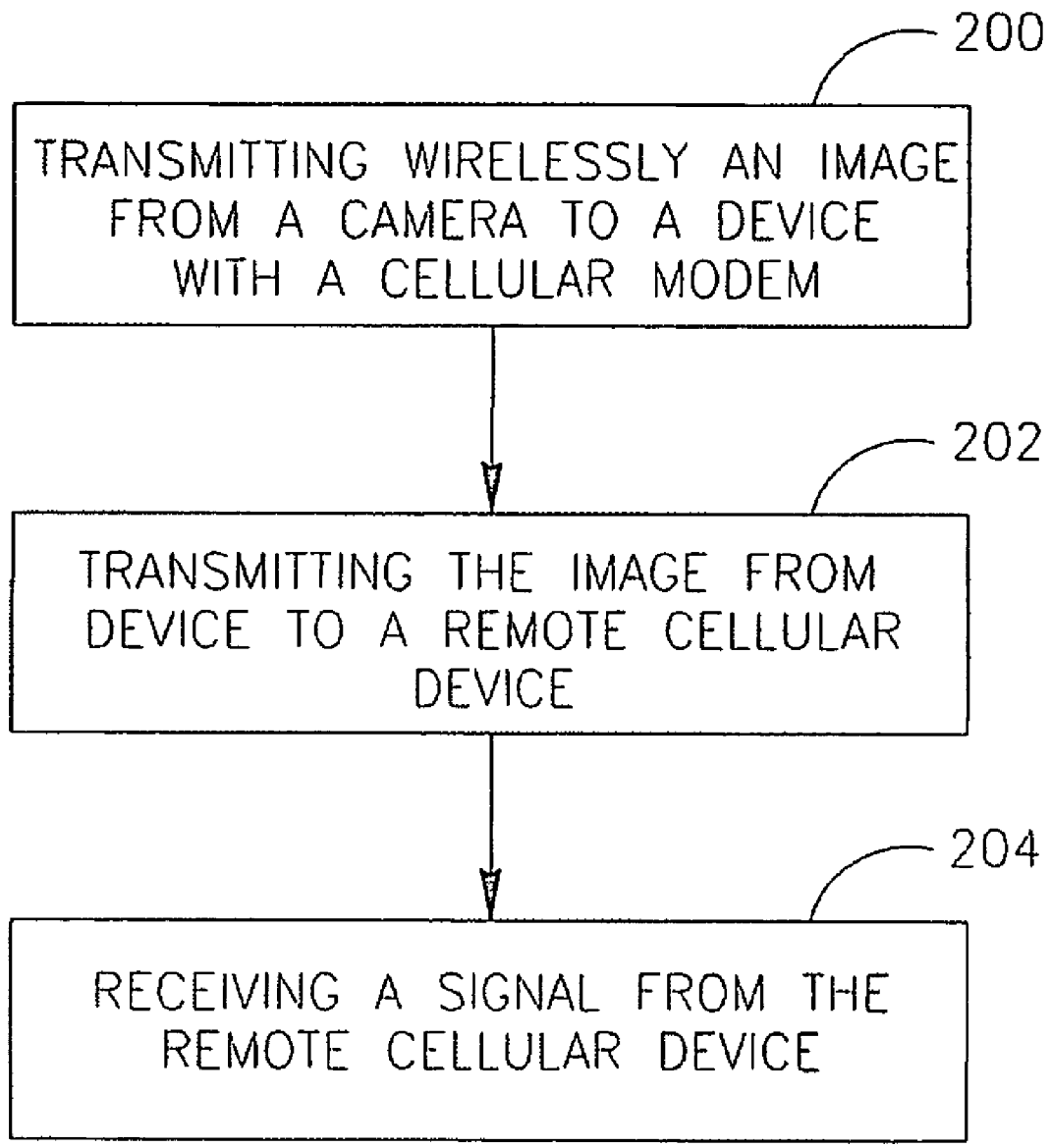
FIG. 2 is a flow diagram of a method in accordance with embodiments of the invention.

Reference is made to FIG. 2, a flow diagram of a method in accordance with an embodiment of the invention. In block 200, a sensor such as a camera may wirelessly transmit an image or image data from an area monitored by such camera to a local device such as a hub, that is or includes, for example, a cellular modem.

In block 202 the hub by way of for example its cellular modem may transmit the image data to a remote cellular device such as a cellular handset. In some embodiments, the hub may include a caller ID along with the data that is sent to the user so that a user may easily identify the source of a call from the hub by data that appears on a screen of the cellular device before the call is answered. In some embodiments, a caller-ID may be used or referenced for identifying a user who may request access to an image or other data collected by a sensor.

In block 204, a user of the cellular handset who may view the image may transmit a signal over the cellular network, back to the hub, and such signal may be received by the hub. The hub may transmit a signal back to the sensor or camera to for example alter a setting of the camera. The hub may send a signal to another device in an area that may observed by the camera or elsewhere to set off an alarm or take other responsive action. In some embodiments, a signal from the remote cellular device may select another camera whose images are to be transmitted to the user. In some embodiments, a user may be requested to identify itself to the hub by for example inputting a unique identifier such as for example a password that may confirm an identity of the user to the hub. Once identified, the hub may transmit other images from for example other cameras to the remote cellular device.

In some embodiments, the data sent from a camera or sensor to the hub and then on to the remote cellular device may include non-image data such as for example identification data of the camera or sensor that produced the image, installation sequence parameters or temperature or other sensory data. In some embodiments, a location, zone or area of the camera of the area viewed by the camera may be transmitted along with an image so that a user can easily identify the location or zone appearing in the transmitted image.

In some embodiments, a user or operator may activate some or all of the sensors or cameras by for example sending a signal to for example a hub.

While the invention has been described with respect to a limited number of embodiments, it will be appreciated that may variations, modifications and other applications of the invention may be made. Embodiments of the present invention may include other apparatuses for performing the operations herein. Such apparatuses may integrate the elements discussed, or may comprise alternative components to carry out the same purpose. It will be appreciated by persons skilled in the art that the appended claims are intended to cover all such modifications and changes fall within the true spirit of the invention.

We claim:

1. A system comprising:
  a plurality of cameras, to capture images of an area and wirelessly transmit said images without resort to Internet; and a central communication device in communication with said plurality of cameras, said central communication device being operative, without resort to Internet,
to wirelessly receive said images,
to transmit said images over a cellular network to a remote cellular device; and
to receive a signal from said remote cellular device, said signal including an instruction to at least one camera of said plurality of cameras,
the system also comprising a memory to store identification data of a plurality of said remote cellular devices, and wherein said central communication device is operative to transmit said image to said plurality of said remote cellular devices and to activate a communication channel among said plurality of said remote cellular devices.

2. The system as in claim 1, wherein a camera of said plurality of said cameras is housed in a unit, said unit comprising a sensor selected from the group consisting of a motion detector, microphone, smoke detector, temperature change detector, carbon monoxide detector, flame detector, glass breakage detector and personal identification sensor.

3. The system as in claim 2, wherein said communication device is further to transmit to said remote cellular device non-image sensory data collected by said sensor of said group of sensors.

4. The system as in claim 3, wherein said non-image sensory data comprises sound data collected by said microphone.

5. A system according to claim 2 wherein said Unit is associated by at least one of inclusion or connection with a transmitter/receiver that transmits signals including sensory data collected by said sensor and receives signals that control or alter a function or functional state of a component of said unit.

6. A system according to claim 5 wherein said transmitter/receiver transmits and receives signals over a wireless connection and wherein said transmitter/receiver may be operative for using at least one of infra red, radio frequency, and other electromagnetic signals.

7. A system according to claim 6 wherein said signals transmitted and received by said transmitter/receiver are sent using a protocol such as Bluetooth, ZigBee, 802.11, 802.16.

8. A system according to claim 6 wherein said signals transmitted and received by said transmitter/receiver are sent using a protocol layer as IP, TCP, UDP, DNS, SMTP, POP3, MIME, HTTP or FTP.

9. A system according to claim 2 wherein at least one of said plurality of camera is operative to transmit images wirelessly via a radio frequency link to a hub.

10. A system according to claim 9 wherein said Hub is operative to identify a remote user such as a cellular handset to whom data such as such image is to be delivered.

11. A system according to claim 10 wherein said hub is operative to transmit the data over a network to a user.

12. The system as in claim 1, wherein said central communication device is to receive from said remote cellular device an instruction selecting for viewing at said remote cellular device at least one view of a camera of said plurality of cameras.

13. The system as in claim 1, comprising a processor to receive a unique identifier from said remote cellular device and to confirm authorization based on said unique identifier.

14. A system according to claim 13 wherein said authorization comprises authorization to perform at least one of viewing an image and issuing an instruction to the system, based on the unique identifier.

15. The system as in claim 1, comprising a memory to record for each of said plurality of cameras a plurality of criteria, and a processor to select said remote cellular device for transmitting thereto based on said criteria.

16. The system as in claim 15, wherein said criteria are selected from the group consisting of a time of day, a day of week, a security level associated with said remote cellular device, and a location of an area appearing in said images.

17. The system as in claim 1, comprising a counter to count a number of said images transmitted to said cellular communication device.

18. The system as in claim 1, wherein said communication system comprises a communication device to transmit said images over a wired network.

19. The system as in claim 1, comprising a processor to issue a second signal in response to said signal, said second signal to activate a device to take an action in response to an element in said image.

20. The system as in claim 19, wherein said action is selected from the group consisting of sounding an alarm, turning on a light, and activating a fire fighting device.

21. The system as in claim 1, comprising a memory to store said image.

22. The system as in claim 1, wherein said communication device is to issue a second signal to alter a setting of a camera of said plurality of said cameras in response to said signal from said remote cellular device.

23. The system as in claim 1, wherein said communication device comprises a cellular modem.

24. The system as in claim 1, wherein said central communication device is to transmit an identifier to said remote cellular device, said identifier to appear on a screen of said remote cellular device.

25. The system as in claim 1, wherein said central communication device is to receive a signal from said remote cellular device, said signal including an instruction to a security system in said area.

26. The system as in claim 1, wherein said central communication device is to receive a signal from said remote cellular device, said signal including an instruction to activate a camera of said plurality of cameras.

27. A method comprising:
providing a plurality of cameras, to capture images of an area and wirelessly transmit said images without resort to Internet; and
using a central communication device in communication with said plurality of cameras, without resort to Internet,
to wirelessly receive said images,
to transmit said images over a cellular network to a remote cellular device; and
to receive a signal from said remote cellular device, said signal including an instruction to at least one camera of said plurality of cameras,
the method also comprising providing a memory to store identification data of a plurality of said remote cellular devices, and wherein said central communication device is operative to transmit said image to said plurality of said remote cellular devices and to activate a communication channel among said plurality of said remote cellular devices.

28. The method as in claim 27, further comprising transmitting said image based on an alarm signal from said at least one camera.

29. The method as in claim 27, comprising transmitting to said remote cellular device non-image sensory data collected in an area displayed in said image.

30. The method of claim 27, further comprising receiving a command signal from said remote cellular device to be executed by said at least one of said plurality of cameras.

31. The method as in claim 30, comprising selecting said at least one camera of said plurality of cameras in response to said command signal from said remote cellular device.

32. The method as in claim 30, comprising confirming a unique identifier transmitted from said remote cellular device as associated with a user authorized to issue said command signal.

33. The method as in claim 30, comprising altering a setting of said at least one camera of said plurality of cameras in response to said command signal from said remote cellular device.

34. The method as in claim 27, wherein transmitting said image from said communication device to said remote cellular device comprises sending said image via a cellular modem included in said communication device.

35. The method as in claim 27, wherein transmitting said image from said communication device to said remote cellular device comprises sending said image via a wired telephone connection.

36. The method as in claim 27, wherein transmitting said image from said communication device to said remote cellular device comprises sending said image via an IP network.

37. A method according to claim 27 wherein, a sensor such as a camera from among said plurality of cameras wirelessly transmits an image or image data from an area monitored by such camera to a local device such as a hub that may be or include a cellular modem.

38. A system comprising:
a plurality of cameras, to capture images of an area and wirelessly transmit said images without resort to Internet; and
a central communication device in communication with said plurality of cameras, said central communication device being operative, without resort to Internet,
to wirelessly receive said images,
to transmit said images over a cellular network to a remote cellular device; and
to receive a signal from said remote cellular device, said signal including an instruction to at least one camera of said plurality of cameras,
the system also comprising a processor to receive a unique identifier from said remote cellular device and to confirm authorization based on said unique identifier,
and wherein said authorization comprises authorization to perform at least one of viewing an image and issuing an instruction to the system, based on the unique identifier.

39. The system as in claim 38, wherein a camera of said plurality of said cameras is housed in a unit, said unit comprising a sensor selected from the group consisting of a motion detector, microphone, smoke detector, temperature change detector, carbon monoxide detector, flame detector, glass breakage detector and personal identification sensor.

40. The system as in claim 39, wherein said communication device is further to transmit to said remote cellular device non-image sensory data collected by said sensor of said group of sensors.

41. The system as in claim 40, wherein said non-image sensory data comprises sound data collected by said microphone.

42. A system according to claim 39 wherein said Unit is associated by at least one of inclusion or connection with a transmitter/receiver that transmits signals including sensory data collected by said sensor and receives signals that control or alter a function or functional state of a component of said unit.

43. A system according to claim 42 wherein said transmitter/receiver transmits and receives signals over a wireless connection and wherein said transmitter/receiver may be operative for using at least one of infra red, radio frequency, and other electromagnetic signals.

44. A system according to claim 43 wherein said signals transmitted and received by said transmitter/receiver are sent using a protocol such as Bluetooth, ZigBee, 802.11, 802.16.

45. A system according to claim 43 wherein said signals transmitted and received by said transmitter/receiver are sent using a protocol layer as IP, TCP, UDP, DNS, SMTP, POP3, MIME, HTTP or FTP.

46. A system according to claim 39 wherein at least one of said plurality of camera is operative to transmit images wirelessly via a radio frequency link to a hub.

47. A system according to claim 46 wherein said Hub is operative to identify a remote user such as a cellular handset to whom data such as such image is to be delivered.

48. A system according to claim 47 wherein said hub is operative to transmit the data over a network to a user.

49. The system as in claim 38, wherein said central communication device is to receive from said remote cellular device an instruction selecting for viewing at said remote cellular device at least one view of a camera of said plurality of cameras.

50. The system as in claim 38, comprising a memory to store identification data of a plurality of said remote cellular devices, and wherein said central communication device is to transmit said image to said plurality of said remote cellular devices and to activate a communication channel among said plurality of said remote cellular devices.

51. The system as in claim 38, comprising a memory to record for each of said plurality of cameras a plurality of criteria, and a processor to select said remote cellular device for transmitting thereto based on said criteria.

52. The system as in claim 51, wherein said criteria are selected from the group consisting of a time of day, a day of week, a security level associated with said remote cellular device, and a location of an area appearing in said images.

53. The system as in claim 38, comprising a counter to count a number of said images transmitted to said cellular communication device.

54. The system as in claim 38, wherein said communication system comprises a communication device to transmit said images over a wired network.

55. The system as in claim 38, comprising a processor to issue a second signal in response to said signal, said second signal to activate a device to take an action in response to an element in said image.

56. The system as in claim 55, wherein said action is selected from the group consisting of sounding an alarm, turning on a light, and activating a fire fighting device.

57. The system as in claim 38, comprising a memory to store said image.

58. The system as in claim 38, wherein said communication device is to issue a second signal to alter a setting of a camera of said plurality of said cameras in response to said signal from said remote cellular device.

59. The system as in claim 38, wherein said communication device comprises a cellular modem.

60. The system as in claim 38, wherein said central communication device is to transmit an identifier to said remote cellular device, said identifier to appear on a screen of said remote cellular device.

61. The system as in claim 38, wherein said central communication device is to receive a signal from said remote cellular device, said signal including an instruction to a security system in said area.

62. The system as in claim 38, wherein said central communication device is to receive a signal from said remote cellular device, said signal including an instruction to activate a camera of said plurality of cameras.

63. A method comprising:
provuding a plurality of cameras, to capture images of an area and wirelessly transmit said images without resort to Internet; and
providing a central communication device in communication with said plurality of cameras, said central communication device being operative, without resort to Internet,
to wirelessly receive said images,
to transmit said images over a cellular network to a remote cellular device; and
to receive a signal from said remote cellular device, said signal including an instruction to at least one camera of said plurality of cameras,
the method also comprising providing a processor to receive a unique identifier from said remote cellular device and to confirm authorization based on said unique identifier,
and wherein said authorization comprises authorization to perform at least one of viewing an image and issuing an instruction to the system, based on the unique identifier.

64. The method as in claim 63, further comprising transmitting said image based on an alarm signal from said at least one camera.

65. The method as in claim 63, comprising transmitting to said remote cellular device non-image sensory data collected in an area displayed in said image.

66. The method of claim 63, further comprising receiving a command signal from said remote cellular device to be executed by said at least one of said plurality of cameras.

67. The method as in claim 66, comprising selecting said at least one camera of said plurality of cameras in response to said command signal from said remote cellular device.

68. The method as in claim 66, comprising confirming a unique identifier transmitted from said remote cellular device as associated with a user authorized to issue said command signal.

69. The method as in claim 66, comprising altering a setting of said at least one camera of said plurality of cameras in response to said command signal from said remote cellular device.

70. The method as in claim 63, wherein transmitting said image from said communication device to said remote cellular device comprises sending said image via a cellular modem included in said communication device.

71. The method as in claim 63, wherein transmitting said image from said communication device to said remote cellular device comprises sending said image via a wired telephone connection.

72. The method as in claim 63, wherein transmitting said image from said communication device to said remote cellular device comprises sending said image via an IP network.

73. A method according to claim 63 wherein, a sensor such as a camera from among said plurality of cameras wirelessly transmits an image or image data from an area monitored by such camera to a local device such as a hub that may be or include a cellular modem.

* * * * *